US009796843B2

(12) United States Patent
Hatanaka et al.

(10) Patent No.: US 9,796,843 B2
(45) **Date of Patent: *Oct. 24, 2017**

(54) COMPOSITION FOR FORMING THERMOSET FILM HAVING PHOTO ALIGNMENT PROPERTIES

(75) Inventors: Tadashi Hatanaka, Funabashi (JP); Isao Adachi, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/381,836

(22) PCT Filed: Jul. 20, 2010

(86) PCT No.: PCT/JP2010/062170
§ 371 (c)(1), (2), (4) Date: Dec. 30, 2011

(87) PCT Pub. No.: WO2011/010635
PCT Pub. Date: Jan. 27, 2011

(65) Prior Publication Data

US 2012/0114879 A1 May 10, 2012

(30) Foreign Application Priority Data

Jul. 21, 2009 (JP) ................................ 2009-170140

(51) Int. Cl.
*C09K 19/56* (2006.01)
*C08L 33/06* (2006.01)
(Continued)

(52) U.S. Cl.
CPC ............ *C08L 33/066* (2013.01); *C08L 33/08* (2013.01); *C09D 133/10* (2013.01);
(Continued)

(58) Field of Classification Search
CPC . C09K 19/56; G02F 1/1337; G02F 1/133711; G02F 1/13378; G02F 1/133788;
(Continued)

(56) References Cited

U.S. PATENT DOCUMENTS 5,938,972 A 8/1999 Yasuda et al.
5,958,995 A * 9/1999 Narang et al. ................. 522/35
(Continued)

FOREIGN PATENT DOCUMENTS

JP A-60-38412 2/1985
JP A-7-294726 11/1995
(Continued)

OTHER PUBLICATIONS

Aug. 24, 2010 International Search Report issued in International Patent Application No. PCT/JP2010/062170.
(Continued)

*Primary Examiner* — Eli D Strah
(74) *Attorney, Agent, or Firm* — Oliff PLC

(57) ABSTRACT

A material from which a cured film exhibiting high solvent resistance, liquid crystal-alignment performance, heat resistance and high transparency can be formed. A composition for forming a thermoset film having photo alignment properties, the composition comprising: a component (A) that is an acrylic copolymer having a photodimerizing moiety and a thermal cross-linking moiety; a component (B) that is an acrylic polymer having at least one of a $C_{2-5}$ alkyl ester group and a $C_{2-5}$ hydroxyalkyl ester group and at least one of a carboxy group and a phenolic hydroxy group; and a component (C) that is a cross-linking agent.

12 Claims, 1 Drawing Sheet

(51) Int. Cl.

| | |
|---|---|
| ***C08L 33/08*** | (2006.01) |
| ***C09D 133/10*** | (2006.01) |
| ***C09D 133/14*** | (2006.01) |
| *G02F 1/1337* | (2006.01) |
| *C08K 5/00* | (2006.01) |
| *C08F 220/14* | (2006.01) |
| *C08F 220/30* | (2006.01) |

(52) U.S. Cl.

CPC ...... *C09D 133/14* (2013.01); *B32B 2457/202* (2013.01); *C08F 220/14* (2013.01); *C08F 2220/303* (2013.01); *C08K 5/0025* (2013.01); *G02F 1/133711* (2013.01); *Y10T 428/1005* (2015.01)

(58) Field of Classification Search

CPC ... G02F 1/133792; G02F 2001/133715; G02F 2001/133738; G02F 2001/133742; G02F 2001/133746; G02F 2001/133749; G02F 2001/133757; G02F 2001/133761; G02F 2001/133765; G02F 2001/133792; C08L 33/066; C08L 33/08; C09D 133/10; C09D 133/14; C08F 2220/303; C08F 220/14; C08K 5/0025; B32B 2457/202

USPC ........ 428/1.1, 1.2, 1.3, 1.33, 1.5, 1.53, 1.54, 428/1.55, 1.6; 525/191, 192, 194; 522/109–112; 349/123–136

See application file for complete search history.

(56) References Cited

U.S. PATENT DOCUMENTS

| | | | | |
|---|---|---|---|---|
| 6,083,575 | A | 7/2000 | Ninomiya et al. | |
| 6,107,427 | A * | 8/2000 | Herr et al. | 526/321 |
| 6,323,310 | B1 * | 11/2001 | Puligadda | C08L 61/28 430/271.1 |
| 6,733,958 | B2 | 5/2004 | Fukuda et al. | |
| 6,924,339 | B2 * | 8/2005 | De et al. | 525/328.8 |
| 2004/0053159 | A1 * | 3/2004 | Wilke | C08G 18/6254 430/270.1 |
| 2004/0138394 | A1 * | 7/2004 | Buchecker et al. | 526/303.1 |
| 2005/0089650 | A1 * | 4/2005 | Tanaka et al. | 428/1.1 |
| 2005/0093924 | A1 * | 5/2005 | Shiba et al. | 347/45 |
| 2005/0288426 | A1 * | 12/2005 | Studer et al. | 524/555 |
| 2007/0093577 | A1 * | 4/2007 | Kim et al. | 524/262 |
| 2007/0128430 | A1 | 6/2007 | Shirai et al. | |
| 2007/0298191 | A1 | 12/2007 | Yamahara et al. | |
| 2009/0290109 | A1 | 11/2009 | Lee et al. | |
| 2013/0029087 | A1 * | 1/2013 | Hatanaka et al. | 428/98 |

FOREIGN PATENT DOCUMENTS

| | | | |
|---|---|---|---|
| JP | A-7-316242 | 12/1995 | |
| JP | A-9-118717 | 5/1997 | |
| JP | A-11-72907 | 3/1999 | |
| JP | A-2000-63684 | 2/2000 | |
| JP | A-2000-103937 | 4/2000 | |
| JP | A-2000-119472 | 4/2000 | |
| JP | A-2001-235625 | 8/2001 | |
| JP | A-2002-287129 | 10/2002 | |
| JP | A-2002-317155 | 10/2002 | |
| JP | A-2003-222868 | 8/2003 | |
| JP | A-2005-37920 | 2/2005 | |
| JP | A-2006-511686 | 4/2006 | |
| JP | A-2007-94271 | 4/2007 | |
| JP | A-2007-121721 | 5/2007 | |
| JP | A-2008-217001 | 9/2008 | |
| JP | A-2008-231163 | 10/2008 | |
| JP | A-2009-138042 | 6/2009 | |
| WO | WO 2009080271 A1 * | 7/2009 | G02F 1/1337 |

OTHER PUBLICATIONS

Jul. 19, 2011 International Search Report issued in International Application No. PCT/JP2011/058632.

Apr. 12, 2013 Office Action issued in U.S. Appl. No. 13/639,773.

U.S. Appl. No. 13/639,773, filed Oct. 5, 2012, to Hatanaka et al.

Aug. 2, 2013 Supplementary European Search Report issued in EP 10 80 2255.

Dec. 10, 2013 Office Action issued in U.S. Appl. No. 13/639,773.

Liu et al., "Enzymatic Synthesis of Photoactive Poly(4-phenylazophenol)," Chem. Mater. 2000, 12, pp. 1577-1584.

* cited by examiner

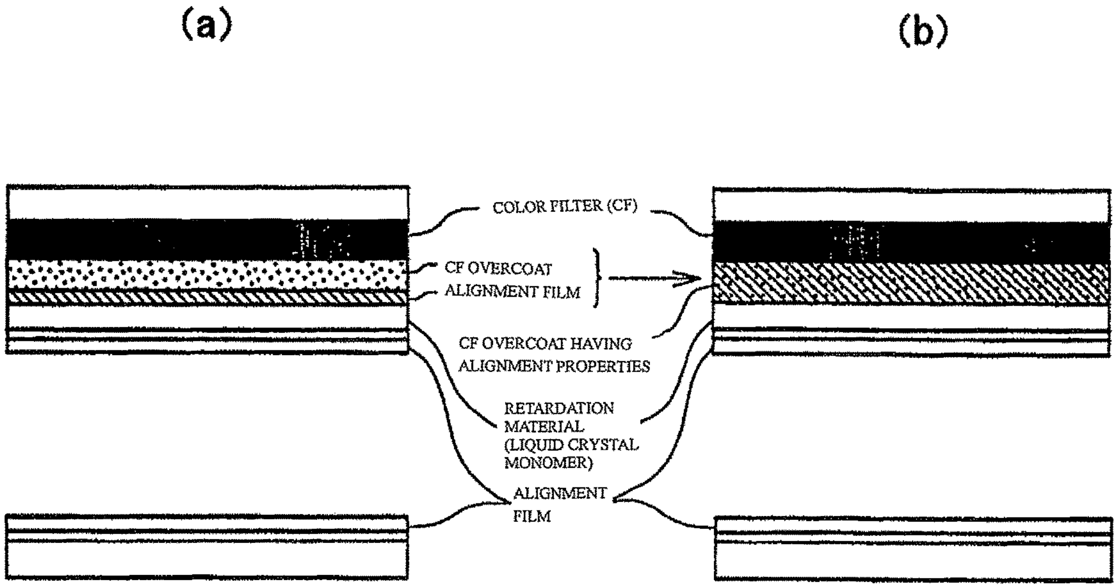
(a)
(b)
COLOR FILTER (CF)
CF OVERCOAT
ALIGNMENT FILM
CF OVERCOAT HAVING
ALIGNMENT PROPERTIES
RETARDATION
MATERIAL
(LIQUID CRYSTAL
MONOMER)
ALIGNMENT
FILM

COMPOSITION FOR FORMING THERMOSET FILM HAVING PHOTO ALIGNMENT PROPERTIES

TECHNICAL FIELD

The present invention relates to a composition for forming a thermoset film having photo alignment properties and a cured film formed from the composition. More specifically, the present invention relates to a composition for forming a thermoset film having high transparency, liquid crystal alignment performance, high solvent resistance, and heat resistance and the cured film. The composition for forming a thermoset film having photo alignment properties of the present invention is especially suitable for a color filter overcoating agent also serving a polymerizable liquid crystal alignment function for forming a built-in retardation layer in a liquid crystal display.

BACKGROUND ART

Commonly, optical devices such as a liquid crystal display device, an organic EL (electroluminescence) device, and a solid image sensing device are provided with a protective film in order to prevent a device surface from exposing to a solvent and heat during a production process. The protective film is required not only to have high adhesiveness to a substrate to be protected and high solvent resistance but also to have excellent properties such as heat resistance.

In addition, when such a protective film is used as a protective film for a color filter that is used in a color liquid crystal display apparatus or a solid image sensing device, the film is required to have high transparency in order to maintain the transmittance of light that transmits through the color filter.

Meanwhile, in recent years, the introduction of a retardation material into a cell in a liquid crystal display has been studied for cost reduction and weight reduction. For such a retardation material, a material is typically used that is obtained by applying, aligning, and photo-curing a polymerizable liquid crystal solution. In order to align the retardation material, an underlayer film is required to be a material having alignment properties after rubbing treatment or polarized UV exposure. To address this, on an overcoat for a color filter, a liquid crystal alignment layer is formed, and then the retardation material is formed (see Figure A). The formation of a film serving as both the liquid crystal alignment layer and the overcoat for a color filter (see Figure B) will achieve great advantages such as cost reduction and reduction in the number of processes. Hence, there is a strong demand for a material serving as both the liquid crystal alignment layer and the overcoat.

Typically, the overcoat for a color filter employs an acrylic resin having high transparency. For dissolving the acrylic resin, glycol solvents such as propylene glycol monomethyl ether and propylene glycol monomethyl ether acetate; ester solvents such as ethyl lactate and butyl lactate; and ketone solvents such as cyclohexanone and methyl amyl ketone are widely used from the viewpoints of handling properties and coating properties. Such an acrylic resin is subjected to thermal curing or photo curing to increase heat resistance and solvent resistance (Patent Documents 1 and 2). The related-art thermosetting or photocurable acrylic resin has appropriate transparency and solvent resistance, but an overcoat composed of this kind of acrylic resin cannot achieve sufficient alignment properties even by the rubbing treatment or polarized UV exposure.

Meanwhile, the liquid crystal alignment layer typically employs a material composed of a solvent soluble polyimide or polyamic acid. It has been disclosed that such a material is completely imidized by post-bake to obtain the solvent resistance, and exhibits sufficient alignment properties by the rubbing treatment (Patent Document 3).

It has been also disclosed that an acrylic resin including a side chain having a photodimerizing moiety such as a cinnamoyl group and a chalcone group is subjected to the polarized UV exposure to exhibit sufficient liquid crystal alignment properties (Patent Document 4).

RELATED ART DOCUMENTS

Patent Documents

Patent Document 1: Japanese Patent Application Publication No. JP-A-2000-103937

Patent Document 2: Japanese Patent Application Publication No. JP-A-2000-119472

Patent Document 3: Japanese Patent Application Publication No. JP-A-2005-037920

Patent Document 4: Japanese Patent Application Publication No. JP-A-9-118717

DISCLOSURE OF THE INVENTION

Problem to be Solved by the Invention

However, the liquid crystal alignment layer disclosed in Patent Document 3 has low transparency for the application to the overcoat material for a color filter. The polyimide and polyamic acid are soluble in a solvent such as N-methylpyrrolidone and γ-butyrolactone, but has low solubility with respect to glycol solvents, ester solvents, and ketone solvents. Thus, the polyimide and polyamic acid are difficult to apply to a production line of the overcoat where such a solvent is used.

In the technique imparting the liquid crystal alignment properties by light exposure, the polarized UV exposure to a liquid crystal alignment layer in a common amount (for example, 100 $mJ/cm^2$) leads to a poor photodimerization rate and to insufficient cross-linkages, and consequently leads to low solvent resistance and low heat resistance. Thus, when a polymerizable liquid crystal is applied in order to form a retardation material layer on the liquid crystal alignment layer, the liquid crystal alignment layer is dissolved to exhibit insufficient alignment properties. The increase of the exposure amount to 1 $J/cm^2$ or more in order to increase the photodimerization rate improves the alignment properties of the polymerizable liquid crystal, but such a method is not practical because the exposure requires a very long time. Moreover, a material used for the related-art liquid crystal alignment layer has only the photodimerizing moiety as a cross-linking moiety. Thus, the number of the cross-linking moieties is small in the whole material, and the formed liquid crystal alignment layer has insufficient heat resistance. Hence, during a production process of a display device at 200° C. or more after the formation of the retardation material, the liquid crystal alignment layer may be significantly contracted.

The present invention has been devised in view of the above circumstances. It is an object of the present invention to provide a material that exhibits high solvent resistance, excellent photo-alignment performance with respect to a polymerizable liquid crystal, sufficient heat resistance, and high transparency after the formation of a cured film and that can be dissolved in glycol solvents, ketone solvents, or lactic acid ester solvents applicable to the formation of a cured film during the production of an overcoat for a color filter.

Means for Solving the Problem

The inventors of the present invention have carried out intensive studies in order to solve the problems and, as a result, have completed the present invention.

That is, as a first aspect, the present invention relates to a composition for forming a thermoset film having photo alignment properties, the composition including a component (A) that is an acrylic copolymer having a photodimerizing moiety and a thermal cross-linking moiety, a component (B) that is an acrylic polymer having at least one of a $C_{2-5}$ alkyl ester group and a $C_{2-5}$ hydroxyalkyl ester group and at least one of a carboxy group and a phenolic hydroxy group, and a component (C) that is a cross-linking agent.

As a second aspect, the present invention relates to the composition for forming a thermoset film having photo alignment properties according to the first aspect, in which the component (A) is an acrylic copolymer obtained by a polymerization reaction of monomers including a monomer having a photodimerizing moiety and a monomer having a thermal cross-linking moiety.

As a third aspect, the present invention relates to the composition for forming a thermoset film having photo alignment properties according to the first aspect or the second aspect, in which the photodimerizing moiety in the component (A) is a cinnamoyl group.

As a fourth aspect, the present invention relates to the composition for forming a thermoset film having photo alignment properties according to any one of the first aspect to the third aspect, in which the thermal cross-linking moiety in the component (A) is a hydroxy group.

As a fifth aspect, the present invention relates to the composition for forming a thermoset film having photo alignment properties according to any one of the first aspect to the fourth aspect, in which the component (B) is an acrylic copolymer obtained by a polymerization reaction of at least one of a monomer having a $C_{2-5}$ alkyl ester group and a monomer having a $C_{2-5}$ hydroxyalkyl ester group and at least one of a monomer having a carboxy group and a monomer having a phenolic hydroxy group.

As a sixth aspect, the present invention relates to the composition for forming a thermoset film having photo alignment properties according to any one of the first aspect to the fifth aspect, in which the cross-linking agent in the component (C) is a cross-linking agent having a methylol group or an alkoxymethylol group.

As a seventh aspect, the present invention relates to the composition for forming a thermoset film having photo alignment properties according to any one of the first aspect to the sixth aspect, the composition further including a component (D) that is an acid or a thermal acid generator.

As an eighth aspect, the present invention relates to the composition for forming a thermoset film having photo alignment properties according to any one of the first aspect to the seventh aspect, the composition further including a component (E) that is a sensitizer.

As a ninth aspect, the present invention relates to the composition for forming a thermoset film having photo alignment properties according to any one of the first aspect to the eighth aspect, in which the composition contains the component (C) in an amount of 1 to 40 part(s) by mass based on 100 parts by mass of a total amount of the component (A) and the component (B).

As a tenth aspect, the present invention relates to the composition for forming a thermoset film having photo alignment properties according to any one of the seventh aspect to the ninth aspect, in which the composition contains the component (D) in an amount of 0.01 to 5 parts by mass based on 100 parts by mass of a total amount of the component (A) and the component (B).

As an eleventh aspect, the present invention relates to the composition for forming a thermoset film having photo alignment properties according to any one of the eighth aspect to the tenth aspect, in which the composition contains the component (E) in an amount of 0.1 to 20 parts by mass based on 100 parts by mass of a total amount of the component (A) and the component (C).

As a twelfth aspect, the present invention relates to a liquid crystal alignment layer formed from the composition for forming a thermoset film having photo alignment properties as described in any one of the first aspect to the eleventh aspect.

As a thirteenth aspect, the present invention relates to an optical device including a liquid crystal alignment layer formed from the composition for forming a thermoset film having photo alignment properties as described in any one of the first aspect to the eleventh aspect and a retardation layer on the liquid crystal alignment layer.

Effects of the Invention

The composition for forming a thermoset film having photo alignment properties of the present invention can form a cured film having high transparency, high solvent resistance, and high heat resistance as well as liquid crystal alignment performance (photo alignment properties) by photoirradiation, and thus can be used as a material for forming a liquid crystal alignment film and an overcoat having photo alignment properties. In particular, this can lead to one-step formation of a "polymerizable liquid crystal alignment layer" serving both characteristics of a layer for aligning a polymerizable liquid crystal that forms a retardation material in a cell of a display and an overcoat layer for a color filter. Hence, the production process is simplified, the number of processes is reduced, and consequently the cost reduction can be achieved.

The composition for forming a thermoset film having photo alignment properties of the present invention is soluble in glycol solvents, ketone solvents, and lactic acid ester solvents, and thus can be suitably used in a production line of an overcoat for a color filter where such a solvent is mainly used.

BRIEF DESCRIPTION OF THE DRAWINGS

The FIGURE shows schematic models comparing a liquid crystal cell (a) including a liquid crystal alignment film that is formed in related art with a liquid crystal cell (b) including a color filter (CF) overcoat having alignment properties that is formed using the composition for forming a thermoset film having photo alignment properties of the present invention.

BEST MODES FOR CARRYING OUT THE INVENTION

The present invention is characterized by a performance improvement of liquid crystal alignment performance (photo alignment properties) by photoirradiation in addition to the improvements of transparency, solvent resistance, and heat resistance. That is, the present invention relates to a composition for forming a thermoset film having photo alignment properties, which includes a component (A) including an acrylic copolymer having a photodimerizing moiety and a thermal cross-linking moiety, a component (B) including an acrylic polymer having at least one of a $C_{2-5}$ alkyl ester group and a $C_{2-5}$ hydroxyalkyl ester group and at least one of a carboxy group and a phenolic hydroxy group, and a component (C) including a cross-linking agent. The present invention further relates to the composition for forming a thermoset film having photo alignment properties, which may further include a component (D) including an acid or a thermal acid generator and a component (E) including a sensitizer in addition to the component (A), the component (B), and the component (C). Here, the thermoset film having photo alignment properties is a film that induces optical anisotropy by linearly polarized light exposure and is cured by heat.

Each component will be described below in detail.

<Component (A)>

The component (A) is an acrylic copolymer having a photodimerizing moiety and a thermal cross-linking moiety.

The present invention can employ, as the acrylic copolymer, a copolymer that is obtained by polymerization of a monomer having an unsaturated double bond, such as acrylic acid esters, methacrylic acid esters, and styrenes.

The acrylic copolymer having a photodimerizing moiety and a thermal cross-linking moiety (hereinafter, also called particular copolymer), which is the component (A), may be any acrylic copolymer as long as the acrylic coplolimer has such a structure, and the skeleton of the main chain, the type of a side chain, and the like of a polymer constituting the acrylic copolymer are not specifically limited.

The photodimerizing moiety is a moiety that forms a dimer by photoirradiation, and specific examples of the moiety include the structures including a cinnamoyl group, a chalcone group, a coumarin group, and an anthracene group. Among them, the structure including a cinnamoyl group exhibiting high transparency in a visible light region and high photodimerization reactivity is preferred. Particularly preferred partial structures of the cinnamoyl group are shown by Formula [A1] and Formula [A2].

[A1]

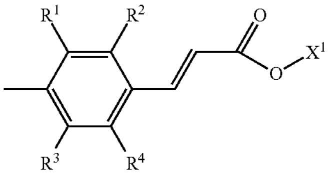

[A2]

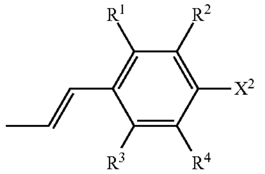

(In Formula [A1], $X^1$ is a hydrogen atom, a $C_{1-18}$ alkyl group, a phenyl group, or a biphenyl group. The phenyl group and the biphenyl group may be substituted with a halogen atom or a cyano group.

In Formula [A2], $X^2$ is a hydrogen atom, a cyano group, a $C_{1-18}$ alkyl group, a phenyl group, a biphenyl group, or a cyclohexyl group. The $C_{1-18}$ alkyl group, the phenyl group, the biphenyl group, and the cyclohexyl group may be bonded through a covalent linkage, an ether linkage, an ester linkage, an amide linkage, or a urea linkage.

Each of $R^1$, $R^2$, $R^3$, and $R^4$ is independently a hydrogen atom, a $C_{1-4}$ alkyl group, a $C_{1-4}$ alkoxy group, a halogen atom, a trifluoromethyl group, or a cyano group).

The thermal cross-linking moiety is a moiety that is bonded to a cross-linking agent by heat, and specific examples of the moiety include a hydroxy group, a carboxy group, and a glycidyl group.

The particular copolymer as the component (A) preferably has a weight average molecular weight of 3,000 to 200,000, more preferably 4,000 to 150,000, and even more preferably 5,000 to 100,000. An excessively large particular copolymer having a weight average molecular weight of more than 200,000 may have low solubility to a solvent to lead to poor handling properties, while an excessively small particular copolymer having a weight average molecular weight of less than 3,000 may lead to insufficient curing during thermal curing to reduce solvent resistance and heat resistance. The weight average molecular weight is a value obtained by gel permeation chromatography (GPC) using polystyrene as a standard sample.

The acrylic copolymer having a photodimerizing moiety and a thermal cross-linking moiety as the component (A) as above is simply synthesized by copolymerization of a monomer having a photodimerizing moiety and a monomer having a thermal cross-linking moiety.

Examples of the monomer having a photodimerizing moiety include a monomer having a cinnamoyl group, a chalcone group, a coumarin group, or an anthracene group. Among them, a monomer having the cinnamoyl group exhibiting good transparency in a visible light region and good photodimerization reactivity is particularly preferred.

In particular, a monomer having the partial structure of the cinnamoyl group of Formula [A1] or Formula [A2] above is more preferred. Specific examples of such a monomer are shown by Formula [A3] and Formula [A4].

[A3]

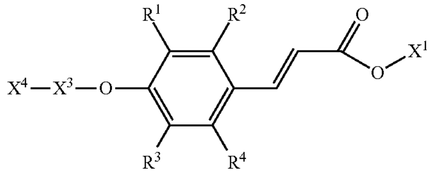

[A4]

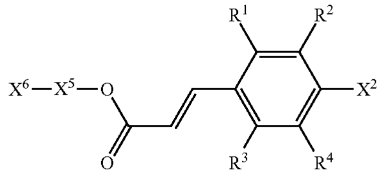

(In Formulae [A3] and [A4], $X^1$ is a hydrogen atom, a $C_{1-18}$ alkyl group, a phenyl group, or a biphenyl group. The phenyl group and the biphenyl group may be substituted with a halogen atom or a cyano group. $X^2$ is a hydrogen atom, a cyano group, a $C_{1-18}$ alkyl group, a phenyl group, a biphenyl group, or a cyclohexyl group. The $C_{1-18}$ alkyl group, the phenyl group, the biphenyl group, and the cyclohexyl group may be bonded through a covalent linkage, an ether linkage, an ester linkage, an amide linkage, or a urea linkage. Each of $X^3$ and $X^5$ is independently a single bond, a $C_{1-20}$ alkylene group, an aromatic ring group, or an aliphatic ring group. Each of $X^4$ and $X^6$ is a polymerizable group.

Each of $R^1$, $R^2$, $R^3$, and $R^4$ is independently a hydrogen atom, a $C_{1-4}$ alkyl group, a $C_{1-4}$ alkoxy group, a halogen atom, a trifluoromethyl group, or a cyano group).

The $C_{1-20}$ alkylene group may be of a branched chain or of a straight chain. Specific examples of the polymerizable group include an acryloyl group, a methacryloyl group, a styrene group, a maleimide group, an acrylamide group, and a methacrylamide group.

Examples of the monomer having a thermal cross-linking moiety include monomers having a hydroxy group, such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2,3-dihydroxypropyl acrylate, 2,3-dihydroxypropyl methacrylate, diethylene glycol monoacrylate, diethylene glycol monomethacrylate, caprolactone 2-(acryloyloxy)ethyl ester, caprolactone 2-(methacryloyloxy)ethyl ester, poly(ethylene glycol) ethyl ether acrylate, poly(ethylene glycol) ethyl ether methacrylate, 5-acryloyloxy-6-hydroxynorbornene-2-carboxylic-6-lactone, and 5-methacryloyloxy-6-hydroxynorbornene-2-carboxylic-6-lactone; monomers having a carboxy group, such as acrylic acid, methacrylic acid, crotonic acid, mono-(2-(acryloyloxy)ethyl) phthalate, mono-(2-(methacryloyloxy)ethyl) phthalate, N-(carboxyphenyl)maleimide, N-(carboxyphenyl)methacrylamide, and N-(carboxyphenyl)acrylamide; monomers having a phenolic hydroxy group, such as hydroxystyrene, N-(hydroxyphenyl) methacrylamide, N-(hydroxyphenyl)acrylamide, N-(hydroxyphenyl)maleimide, and N-(hydroxyphenyl)maleimide; and monomers having a glycidyl group, such as glycidyl methacrylate and glycidyl acrylate.

In the present invention, in the production of the particular copolymer, in addition to monomers having the photodimerizing moiety and the thermal cross-linking moiety (hereinafter, also called particular functional group), a monomer that does not have the particular functional group and that can be copolymerized with the monomers may be used in combination.

Specific examples of such a monomer include an acrylic acid ester compound, a methacrylic acid ester compound, a maleimide compound, an acrylamide compound, acrylonitrile, maleic acid anhydride, a styrene compound, and a vinyl compound.

Specific examples of the monomer are shown below but are not limited to them.

Examples of the acrylic acid ester compound include methyl acrylate, ethyl acrylate, isopropyl acrylate, benzyl acrylate, naphthyl acrylate, anthryl acrylate, anthrylmethyl acrylate, phenyl acrylate, glycidyl acrylate, 2,2,2-trifluoroethyl acrylate, tert-butyl acrylate, cyclohexyl acrylate, isobornyl acrylate, 2-methoxyethyl acrylate, methoxytriethylene glycol acrylate, 2-ethoxyethyl acrylate, 2-aminoethyl acrylate, tetrahydrofurfuryl acrylate, 3-methoxybutyl acrylate, 2-methyl-2-adamantyl acrylate, 2-propyl-2-adamantyl acrylate, 8-methyl-8-tricyclodecyl acrylate, and 8-ethyl-8-tricyclodecyl acrylate.

Examples of the methacrylic acid ester compound include methyl methacrylate, ethyl methacrylate, isopropyl methacrylate, benzyl methacrylate, naphthyl methacrylate, anthryl methacrylate, anthrylmethyl methacrylate, phenyl methacrylate, glycidyl methacrylate, 2,2,2-trifluoroethyl methacrylate, tert-butyl methacrylate, cyclohexyl methacrylate, isobornyl methacrylate, 2-methoxyethyl methacrylate, methoxytriethylene glycol methacrylate, 2-ethoxyethyl methacrylate, 2-aminomethyl methacrylate, tetrahydrofurfuryl methacrylate, 3-methoxybutyl methacrylate, 2-methyl-2-adamantyl methacrylate, γ-butyrolactone methacrylate, 2-propyl-2-adamantyl methacrylate, 8-methyl-8-tricyclodecyl methacrylate, and 8-ethyl-8-tricyclodecyl methacrylate.

Examples of the maleimide compound include maleimide, N-methylmaleimide, N-phenylmaleimide, and N-cyclohexylmaleimide.

Examples of the styrene compound include styrene, methylstyrene, chlorostyrene, and bromostyrene.

Examples of the vinyl compound include methyl vinyl ether, benzyl vinyl ether, vinylnaphthalene, vinylcarbazole, allyl glycidyl ether, 3-ethenyl-7-oxabicyclo[4.1.0]heptane, 1,2-epoxy-5-hexene, and 1,7-octadiene monoepoxide.

As for the amount of each monomer to be used in order to obtain a particular copolymer, it is preferable that the monomer having a photodimerizing moiety be used in an amount of 25 to 90% by mol, the monomer having a thermal cross-linking moiety be used in an amount of 10 to 75% by mol, and the monomer without a particular functional group be used in an amount of 0 to 65% by mol, based on the total amount of the whole monomers. The monomer having a photodimerizing moiety is contained in an amount of less than 25% by mol is unlikely to impart highly sensitive, good liquid crystal alignment properties. The monomer having a thermal cross-linking moiety is contained in an amount of less than 10% by mol is unlikely to impart sufficient heat resistance and to maintain highly sensitive, good liquid crystal alignment properties.

The method for obtaining the particular copolymer used in the present invention is not specifically limited. For example, the particular copolymer can be obtained through polymerization of monomers having the particular functional groups, if desired, a monomer without the particular functional group, a polymerization initiator, and the like in a solvent at a temperature of 50 to 110° C. At that time, any solvent can be used as long as the monomers having the particular functional groups, the monomer without the particular functional group used if desired, the polymerization initiator, and the like can be dissolved. Specific examples will be described in <Solvent> below.

The particular copolymer obtained by the method is typically in a solution state, being dissolved in a solvent.

A solution of the particular copolymer obtained by the method may be poured into diethyl ether, water, or the like with stirring for reprecipitation, and the formed precipitate may be filtered, washed, and then dried under ambient or reduced pressure at ambient temperature or with heat to give a powder of the particular copolymer. The operation can remove the polymerization initiator and unreacted monomers that are present along with the particular copolymer, and as a result, a powder of the purified particular copolymer can be obtained. When the polymer cannot be sufficiently purified through one operation, the obtained powder may be redissolved in a solvent and subjected to the operation repeatedly.

In the present invention, the particular copolymer may be used as the powder or as a solution in which the purified powder is redissolved in a solvent described later.

In the present invention, the particular copolymer as the component (A) may be a mixture with a plurality of types of particular copolymers.

<Component (B)>

The component (B) is an acrylic polymer having at least one of a $C_{2-5}$ alkyl ester group and a $C_{2-5}$ hydroxyalkyl ester group and at least one of a carboxy group and a phenolic hydroxy group.

The present invention can employ, as the acrylic polymer, a polymer that is obtained by polymerization of a monomer having an unsaturated double bond, such as acrylic acid esters, methacrylic acid esters, and styrenes.

The acrylic polymer having at least one of a $C_{2-5}$ alkyl ester group and a $C_{2-5}$ hydroxyalkyl ester group and at least one of a carboxy group and a phenolic hydroxy group, which is the component (B), may be any acrylic polymer as long as the acrylic polymer has such a structure, and the skeleton of the main chain, the type of a side chain, and the like of a polymer constituting the acrylic polymer are not specifically limited.

For the structural unit having at least one of a $C_{2-5}$ alkyl ester group and a $C_{2-5}$ hydroxyalkyl ester group, a preferred structural unit is shown by Formula [B1] below.

For the structural unit having at least one of a carboxy group and a phenolic hydroxy group, a preferred structural unit is shown by Formula [B2] below.

[B1]

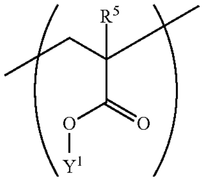

[B2]

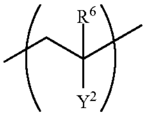

(In Formulae [B1] and [B2], each of $R^5$ and $R^6$ is independently a hydrogen atom or a methyl group; $Y^1$ is a $C_{1-4}$ alkyl group or a $C_{1-3}$ hydroxyalkyl group; and $Y^2$ is a carboxy group or a phenolic hydroxy group).

The acrylic polymer as the component (B) preferably has a weight average molecular weight of 3,000 to 200,000, more preferably 4,000 to 150,000, and even more preferably 5,000 to 100,000. An excessively large acrylic polymer having a weight average molecular weight of more than 200,000 may have low solubility to a solvent to lead to poor handling properties, while an excessively small acrylic polymer having a weight average molecular weight of less than 3,000 may lead to insufficient curing during thermal curing to reduce solvent resistance and heat resistance. The weight average molecular weight is a value obtained by gel permeation chromatography (GPC) using polystyrene as a standard sample.

The acrylic polymer as the component (B) as above is simply synthesized by copolymerization of a monomer having at least one of a $C_{2-5}$ alkyl ester group and a $C_{1-4}$ hydroxyalkyl ester group (hereinafter, monomer b1) and a monomer having at least one of a carboxy group and a phenolic hydroxy group (hereinafter, monomer b2).

Examples of the monomer having a $C_{2-5}$ alkyl ester group include methyl methacrylate, methyl acrylate, ethyl methacrylate, ethyl acrylate, propyl methacrylate, propyl acrylate, isopropyl methacrylate, isopropyl acrylate, butyl methacrylate, butyl acrylate, isobutyl methacrylate, isobutyl acrylate, t-butyl methacrylate, and t-butyl acrylate.

Examples of the monomer having a $C_{2-5}$ hydroxyalkyl ester group include 2-hydroxyethyl methacrylate, 2-hydroxyethyl acrylate, 2-hydroxypropyl methacrylate, and 2-hydroxypropyl acrylate.

Examples of the monomer having a carboxy group include acrylic acid, methacrylic acid, and vinylbenzoic acid.

Examples of the monomer having a phenolic hydroxy group include p-hydroxystyrene, m-hydroxystyrene, and o-hydroxystyrene.

In the present invention, in the production of the acrylic polymer as the component (B), in addition to the monomer b1 and the monomer b2, another monomer that can be copolymerized with the monomers may be used in combination as long as the effect of the invention is not impaired.

Examples of such a monomer include an acrylic acid ester compound, a methacrylic acid ester compound, a maleimide compound, an acrylamide compound, acrylonitrile, maleic acid anhydride, a styrene compound, and a vinyl compound.

Specific examples of the monomer include, but are not limited to, monomers usable for the particular copolymer except for the monomer b1 and the monomer b2.

As for each amount of the monomer b1 and the monomer b2 to be used in order to obtain the acrylic polymer as the component (B), it is preferable that the monomer b1 be used in an amount of 2 to 95% by mol and the monomer b2 be used in an amount of 5 to 98% by mol based on the total amount of the whole monomers to be used in order to obtain the acrylic polymer as the component (B).

When a monomer having the carboxy group alone is used as the monomer b2, it is preferable that the monomer b1 be used in an amount of 60 to 95% by mol and the monomer b2 be used in an amount of 5 to 40% by mol.

Meanwhile, when a monomer having the phenolic hydroxy group alone is used as the monomer b2, it is preferable that the monomer b1 be used in an amount of 2 to 80% by mol and the monomer b2 be used in an amount of 20 to 98% by mol. The monomer b2 that is used in an excessively small amount is likely to lead to insufficient liquid crystal alignment properties, while the monomer b2 that is used in an excessively large amount is likely to reduce compatibility with the acrylic copolymer as the component (A).

The method for obtaining the acrylic polymer as the component (B) used in the present invention is not specifically limited. For example, the acrylic polymer can be obtained through polymerization of the monomer b1, the monomer b2, if desired, a monomer except for the monomer b1 and the monomer b2, a polymerization initiator, and the like in a solvent at a temperature of 50 to 110° C. At that time, any solvent can be used as long as the monomer b1, the monomer b2, the monomer except for the monomer b1 and the monomer b2 used if desired, the polymerization initiator, and the like can be dissolved. Specific examples will be described in <Solvent> below.

The acrylic polymer as the component (B) obtained by the method is typically in a solution state, being dissolved in a solvent.

A solution of the acrylic copolymer as the component (B) obtained by the method may be poured into diethyl ether, water, or the like with stirring for reprecipitation, and the formed precipitate may be filtered, washed, and then dried under ambient or reduced pressure at ambient temperature or with heat to produce a powder of the acrylic copolymer as the component (B). The operation can remove the polymerization initiator and unreacted monomers that are present along with the acrylic copolymer as the component (B), and as a result, a powder of the purified acrylic copolymer as the component (B) can be obtained. When the polymer cannot be sufficiently purified through one operation, the obtained powder may be redissolved in a solvent and subjected to the operation repeatedly.

In the present invention, the acrylic copolymer as the component (B) may be used as the powder or as a solution in which the purified powder is redissolved in a solvent described later.

In the present invention, the acrylic copolymer as the component (B) may be a mixture with a plurality of types of the acrylic copolymers as the component (B).

<Component (C)>

The component (C) of the present invention is a cross-linking agent that is bonded to the thermal cross-linking moiety in the particular copolymer as the component (A) and the carboxy group moiety and/or the phenolic hydroxy group moiety included in the component (B). Examples of the cross-linking agent include compounds such as an epoxy compound, a methylol compound, and an isocyanate compound, and the methylol compound is preferred.

Specific examples of the methylol compound include compounds such as an alkoxymethylated glycoluril, an alkoxymethylated benzoguanamine, and an alkoxymethylated melamine.

Specific examples of the alkoxymethylated glycoluril include 1,3,4,6-tetrakis(methoxymethyl)glycoluril, 1,3,4,6-tetrakis(butoxymethyl)glycoluril, 1,3,4,6-tetrakis(hydroxymethyl)glycoluril, 1,3-bis(hydroxymethyl)urea, 1,1,3,3-tetrakis(butoxymethyl)urea, 1,1,3,3-tetrakis(methoxymethyl)urea, 1,3-bis(hydroxymethyl)-4,5-dihydroxy-2-imidazolinone, and 1,3-bis(methoxymethyl)-4,5-dimethoxy-2-imidazolinone. Examples of commercial products include compounds such as glycoluril compounds (trade names CYMEL® 1170, POWDERLINK® 1174), a methylated urea resin (trade name UFR® 65), and butylated urea resins (trade names UFR® 300, U-VAN 10S60, U-VAN 10R, U-VAN 11HV), manufactured by Nippon Cytec Industries Co. (formerly Mitsui Cytec, Ltd.) and urea/formaldehyde resins (highly condensed type, trade names BECKAMINE® J-300S, BECKAMINE® P-955, BECKAMINE® N) manufactured by DIC Corporation (formerly Dainippon Ink and Chemicals, Inc.).

Specific examples of the alkoxymethylated benzoguanamine include tetramethoxymethyl benzoguanamine. Examples of commercial products include a product manufactured by Nihon Cytec Industries Inc. (formerly Mitsui Cytec, Ltd.) (trade name: CYMEL® 1123) and products manufactured by SANWA Chemical Co., Ltd. (trade name: NIKALAC® BX-4000, NIKALAC® BX-37, NIKALAC® BL-60, NIKALAC® BX-55H).

Specific examples of the alkoxymethylated melamine include hexamethoxymethyl melamine. Examples of commercial products include methoxymethyl type melamine compounds (trade name: CYMEL® 300, CYMEL® 301, CYMEL® 303, CYMEL® 350) and butoxymethyl type melamine compounds (trade name: MYCOAT® 506, MYCOAT® 508) manufactured by Nihon Cytec Industries Inc. (formerly Mitsui Cytec, Ltd.) and methoxymethyl type melamine compounds (trade name: NIKALAC® MW-30, NIKALAC® MW-22, NIKALAC® MW-11, NIKALAC® MS-001, NIKALAC® MX-002, NIKALAC® MX-730, NIKALAC® MX-750, NIKALAC® MX-035) and butoxymethyl type melamine compounds (trade name: NIKALAC® MX-45, NIKALAC® MX-410, NIKALAC® MX-302) manufactured by SANWA Chemical Co., Ltd.

The cross-linking agent may be a compound obtained by condensation of a melamine compound, a urea compound, a glycoluril compound, or a benzoguanamine compound in which a hydrogen atom of such an amino group is substituted by a methylol group or an alkoxymethyl group. Examples of the compound include a high molecular weight compound produced from a melamine compound or a benzoguanamine compound disclosed in U.S. Pat. No. 6,323,310. Examples of commercial products of the melamine compound include trade name CYMEL® 303 (manufactured by Nihon Cytec Industries Inc. (formerly Mitsui Cytec, Ltd.)), and examples of commercial products of the benzoguanamine compound include trade name CYMFL® 1123 (manufactured by Nihon Cytec Industries Inc. (formerly Mitsui Cytec, Ltd.)).

As the component (C), polymers produced using acrylamide compounds or methacrylamide compounds that are substituted with a hydroxymethyl group or an alkoxymethyl group, such as N-hydroxymethylacrylamide, N-methoxymethylmethacrylamide, N-ethoxymethylacrylamide, and N-butoxymethylmethacrylamide may also be used.

Examples of such a polymer include poly(N-butoxymethylacrylamide), a copolymer of N-butoxymethylacrylamide and styrene, a copolymer of N-hydroxymethylmethacrylamide and methyl methacrylate, a copolymer of N-ethoxymethylmethacrylamide and benzyl methacrylate, and a copolymer of N-butoxymethylacrylamide, benzyl methacrylate, and 2-hydroxypropyl methacrylate. Such a polymer has a weight average molecular weight of 1,000 to 500,000, preferably 2,000 to 200,000, more preferably 3,000 to 150,000, and even more preferably 3,000 to 50,000. The weight average molecular weight is a value obtained by gel permeation chromatography (GPC) using polystyrene as a standard sample.

These cross-linking agents can be used singly or in combination of two or more of them.

In the composition for forming a thermoset film having photo alignment properties of the present invention, the cross-linking agent as the component (C) is preferably contained in an amount of 1 to 40 part(s) by mass and more preferably 5 to 30 parts by mass based on 100 parts by mass of the total amount of the particular copolymer as the component (A) and the acrylic copolymer as the component (B). The cross-linking agent that is contained in an excessively small amount reduces the solvent resistance and the heat resistance of the cured film that is obtained from the composition for forming a thermoset film having photo alignment properties and lowers the sensitivity during photo alignment. Meanwhile, the cross-linking agent that is contained in an excessively large amount may reduce the photo alignment properties and the storage stability.

<Component (D)>

In the present invention, an acid or a thermal acid generator may be contained as a component (D). The component (D) is effective on the acceleration of thermosetting reaction of the composition for forming a thermoset film having photo alignment properties of the present invention.

The component (D) is not specifically limited as long as it is a sulfonic acid group-containing compound, hydrochloric acid or a salt of hydrochloric acid, or a compound that is thermally decomposed to generate an acid during a pre-baking or post-baking process, that is, a compound that is thermally decomposed to generate an acid at a temperature from 80° C. to 250° C. Examples of such a compound include hydrochloric acid; sulfonic acids such as methanesulfonic acid, ethanesulfonic acid, propanesulfonic acid, butanesulfonic acid, pentanesulfonic acid, octanesulfonic acid, benzenesulfonic acid, p-toluenesulfonic acid, camphorsulfonic acid, trifluoromethanesulfonic acid, p-phenolsulfonic acid, 2-naphthalenesulfonic acid, mesitylenesulfonic acid, p-xylene-2-sulfonic acid, m-xylene-2-sulfonic acid, 4-ethylbenzenesulfonic acid, 1H,1H,2H,2H-perfluorooctanesulfonic acid, perfluoro(2-ethoxyethane)sulfonic acid, pentafluoroethanesulfonic acid, nonafluorobutane-1-sulfonic acid, and dodecylbenzenesulfonic acid; and hydrates and salts of the acids. Examples of the compound generating an acid by heat include bis(tosyloxy)ethane, bis(tosyloxy)propane, bis(tosyloxy)butane, p-nitrobenzyl tosylate, o-nitrobenzyl tosylate, 1,2,3-phenylene tris(methyl sulfonate), p-toluenesulfonic acid pyridinium salt, p-toluenesulfonic acid morpholinium salt, p-toluenesulfonic acid ethyl ester, p-toluenesulfonic acid propyl ester, p-toluenesulfonic acid butyl ester, p-toluenesulfonic acid isobutyl ester, p-toluenesulfonic acid methyl ester, p-toluenesulfonic acid phenethyl ester, cyanomethyl p-toluenesulfonate, 2,2,2-trifluoroethyl p-toluenesulfonate, 2-hydroxybutyl p-tosylate, and N-ethyl-4-toluenesulfonamide.

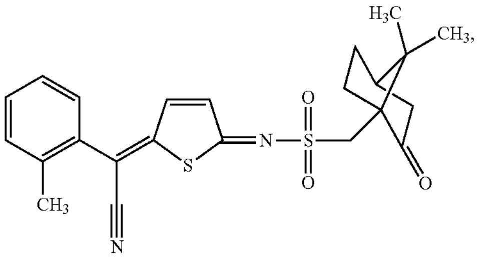

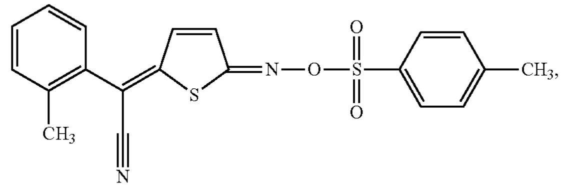

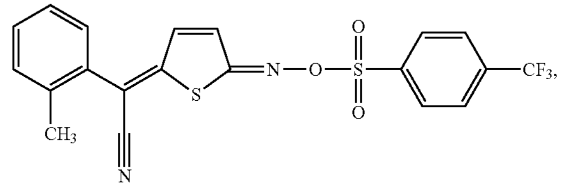

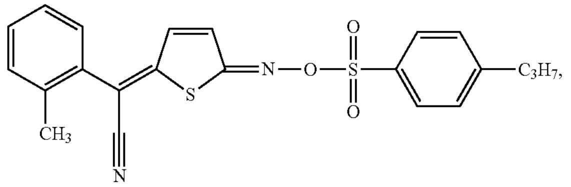

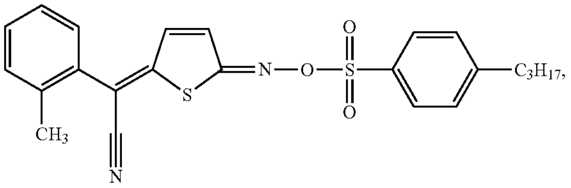

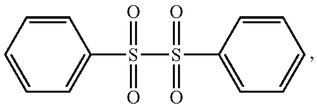

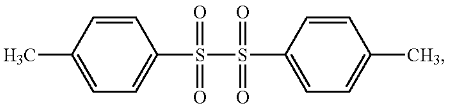

-continued

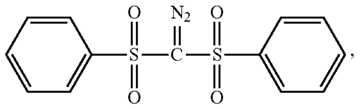

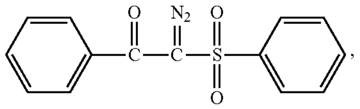

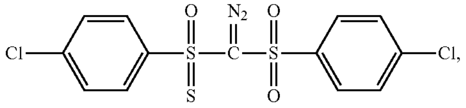

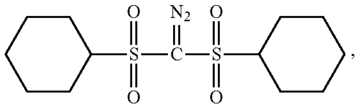

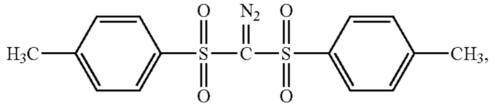

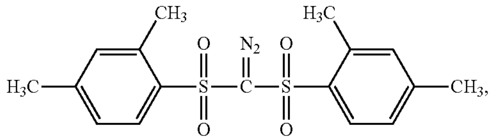

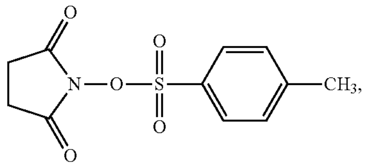

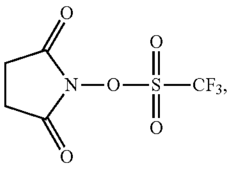

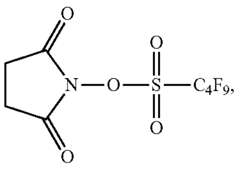

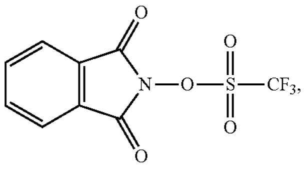

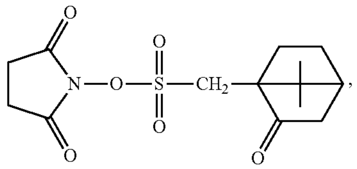

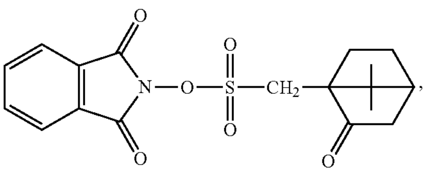

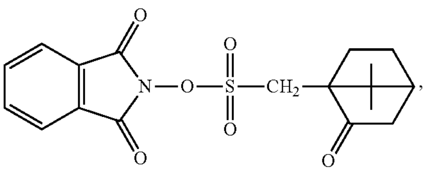

-continued
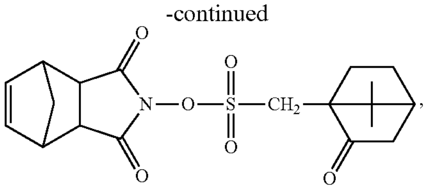
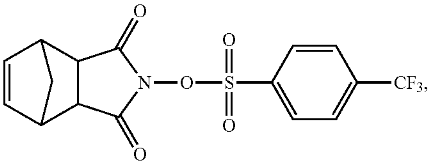
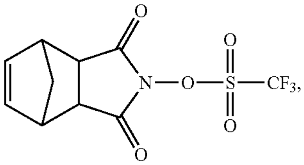
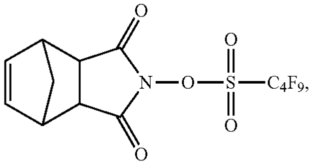
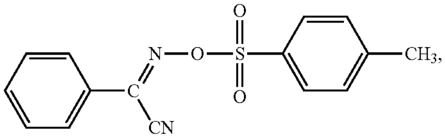
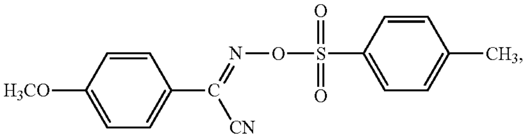
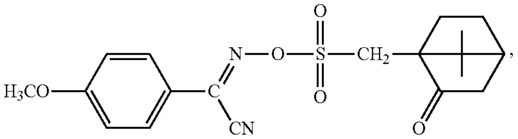
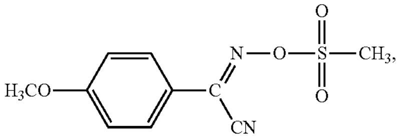
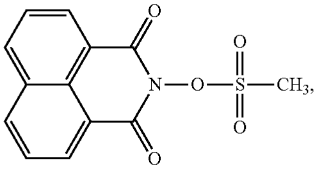
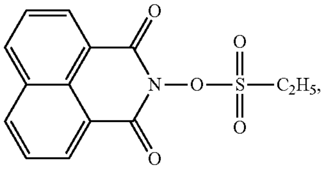
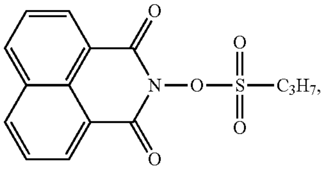
-continued
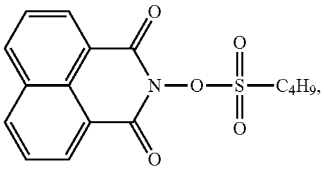
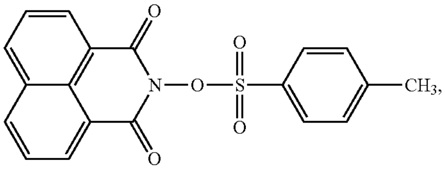
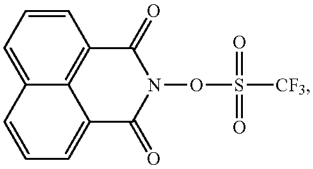
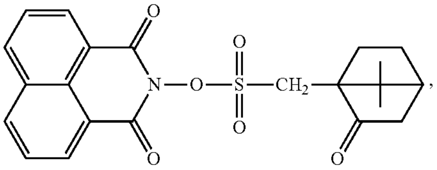
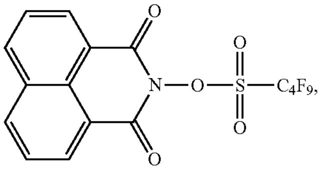
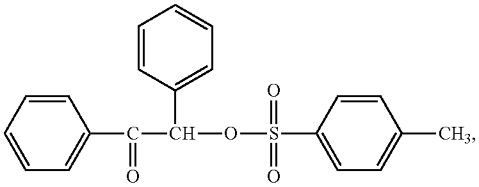
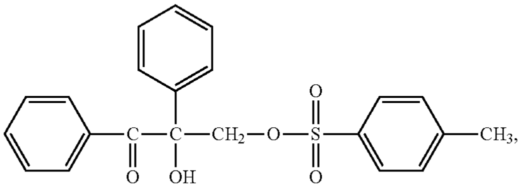
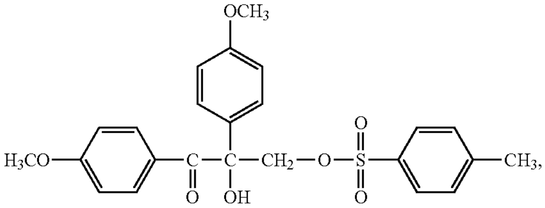
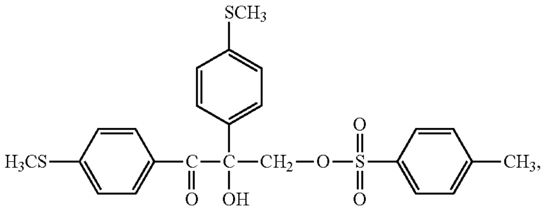

-continued

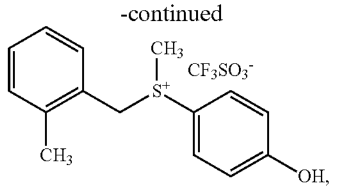

In the composition for forming a thermoset film having photo alignment properties of the present invention, the component (D) is preferably contained in an amount of 0.01 to 5 parts by mass, more preferably 0.05 to 3 parts by mass, and even more preferably 0.1 to 1 part(s) by mass, based on 100 parts by mass of the total amount of the particular copolymer as the component (A) and the acrylic copolymer as the component (B). The component (D) that is contained in an amount of 0.01 parts by mass or more can impart sufficient thermosetting properties and solvent resistance as well as high sensitivity with respect to photoirradiation. However, the component (D) that is contained in an amount of more than 5 parts by mass may reduce the storage stability of the composition.

<Component (E)>

In the present invention, a sensitizer may be contained as a component (E). The component (E) is effective on the acceleration of photodimerization reaction after the formation of the thermoset film of the present invention.

Examples of the sensitizer as the component (E) include benzophenone, anthracene, anthraquinone, thioxanthone, and derivatives of them, or nitrophenyl compounds. Among them, the benzophenone derivatives and the nitrophenyl compounds are preferred. Specific examples of the preferred compounds include N,N-diethylaminobenzophenone, 2-nitrofluorene, 2-nitrofluorenone, 5-nitroacenaphthene, and 4-nitrobiphenyl. In particular, N,N-diethylaminobenzophenone as a benzophenone derivative is preferred.

The sensitizer is not limited to the compounds above. These compounds can be used singly or in combination of two or more of them as the sensitizer.

In the composition for forming a thermoset film having photo alignment properties of the present invention, the sensitizer as the component (E) is preferably contained in an amount of 0.1 to 20 parts by mass and more preferably 0.2 to 10 parts by mass based on 100 parts by mass of the total amount of the particular copolymer as the component (A) and the acrylic polymer as the component (B). The sensitizer that is used in an excessively small ratio may achieve insufficient effect as the sensitizer, and the sensitizer that is used in an excessively large ratio may reduce the transmittance and lead to a rough coating film.

<Solvent>

The composition for forming a thermoset film having photo alignment properties of the present invention is used mainly in a solution state dissolved in a solvent. The solvent used for the solution may be any solvent as long as the component (A), the component (B), and the component (C), and as necessary, the component (D), the component (E), and/or other additives described later can be dissolved, and the type, structure, and the like are not specifically limited.

Specific examples of the solvent include ethylene glycol monomethyl ether, ethylene glycol monoethyl ether, methyl cellosolve acetate, ethyl cellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, toluene, xylene, methyl ethyl ketone, cyclopentanone, cyclohexanone, 2-butanone, 3-methyl-2-pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, N,N-dimethylformamide, N,N-dimethylacetamide, and N-methylpyrrolidone.

These solvents may be used singly or in combination of two or more of them. Among these solvents, propylene glycol monomethyl ether, propylene glycol monomethyl ether acetate, cyclohexanone, 2-heptanone, propylene glycol propyl ether, propylene glycol propyl ether acetate, ethyl lactate, butyl lactate, methyl 3-methoxypropionate, ethyl 3-methoxypropionate, ethyl 3-ethoxypropionate, and methyl 3-ethoxypropionate are more preferred because these solvents can be used in a production line of an overcoat for a color filter, have good film formability, and are highly safe.

<Other Additives>

The composition for forming a thermoset film having photo alignment properties of the present invention may further contain, as necessary, a silane coupling agent, a surfactant, a rheology control agent, a pigment, a dye, a storage stabilizer, a defoaming agent, an antioxidant, and the like as long as the effect of the invention is not impaired.

<Composition for Forming Thermoset Film Having Photo Alignment Properties>

The composition for forming a theiinoset film having photo alignment properties of the present invention is a composition that contains the particular copolymer as the component (A), the acrylic copolymer as the component (B), and the cross-linking agent as the component (C) and may include, if desired, the acid or the thermal acid generator as the component (D), the sensitizer as the component (E), and one or more of the other additives. The composition is typically used as a solution in which these components are dissolved in a solvent.

The compounding ratio of the component (A) and the component (B) is preferably 5:95 to 60:40. The component (B) that is contained in an excessively large amount is likely to reduce the liquid crystal alignment properties, while the component (B) that is contained in an excessively small amount reduces the compatibility with the component (A) and is likely to cause whitening of a formed coating film.

Preferred examples of the composition for forming a thermoset film having photo alignment properties of the present invention are as below.

[1]: The composition for forming a thermoset film having photo alignment properties that contains the component (A) and the component (B) in a compounding ratio of 5:95 to 60:40 and contains the component (C) in an amount of 1 to 40 part(s) by mass based on 100 parts by mass of the total amount of the component (A) and the component (B).

[2]: The composition for forming a thermoset film having photo alignment properties that contains the component (C) in an amount of 1 to 40 part(s) by mass based on 100 pails by mass of the total amount of the component (A) and the component (B) and a solvent.

[3]: The composition for forming a thermoset film having photo alignment properties that contains the component (C) in an amount of 1 to 40 part(s) by mass, the component (D) in an amount of 0.01 to 5 parts by mass, based on 100 parts by mass of the total amount of the component (A) and the component (B), and a solvent.

[4]: The composition for forming a thermoset film having photo alignment properties that contains the component (C) in an amount of 1 to 40 part(s) by mass, the component (D) in an amount of 0.01 to 5 parts by mass, the component (E) in an amount of 0.1 to 20 parts by mass, based on 100 parts by mass of the total amount of the component (A) and the component (B), and a solvent.

For the composition for forming a thermoset film having photo alignment properties of the present invention to be used as a solution, the compounding ratio, preparation method, and the like are as described below in detail.

The composition for forming a thermoset film having photo alignment properties of the present invention may have any solid content ratio as long as each component is homogeneously dissolved in a solvent, and the solid content ratio is 1 to 80% by mass, preferably 3 to 60% by mass, and more preferably 5 to 40% by mass. Here, the solid content means all components of the composition for forming a thermoset film having photo alignment properties except for the solvent component.

A preparation method of the composition for forming a thermoset film having photo alignment properties of the present invention is not specifically limited. Examples of the preparation method include a method in which the component (A) dissolved in a solvent and the component (B) dissolved in a solvent are mixed and, to the solution, the component (C) as well as the component (D) and the component (E) are mixed in predetermined ratios to make a homogeneous solution and a method in which the other additives are, as necessary, further added and mixed in an appropriate step in the above preparation method.

In the preparation of the composition for forming a thermoset film having photo alignment properties of the present invention, a solution of the particular copolymer that is obtained by polymerization reaction in a solvent may be used as it is. In this case, a solution of the component (A) that is obtained by copolymerization of the monomer having a photodimerizing moiety and the monomer having a thermal cross-linking moiety and a solution of the component (B) that is obtained by copolymerization of at least one of the monomer having a $C_{2-5}$ alkyl ester group and the monomer having a hydroxyalkyl ester group and at least one of the monomer having a carboxy group and the monomer having a phenolic hydroxy group are mixed and, to the solution, the component (C), the component (D), the component (E), and the like are added to make a homogeneous solution in a similar manner to the above. At the time, a solvent may be further added in order to adjust the concentration. At the time, the solvent used in the production process of the component (A), the solvent used in the production process of the component (B), and the solvent used for the concentration adjustment of the composition for forming a thermoset film having photo alignment properties may be the same as or different from each other.

The prepared solution of the composition for forming a thermoset film having photo alignment properties is preferably filtered using a filter having a pore size of about 0.2 μm and the like for use.

<Coated Film, Cured Film, and Liquid Crystal Alignment Layer>

The solution of the composition for forming a thermoset film having photo alignment properties as an embodiment of the present invention is applied onto a substrate (for example, a silicon/silicon dioxide coated substrate, a silicon nitride substrate, a substrate coated with a metal such as aluminum, molybdenum, and chromium, a glass substrate, a quartz substrate, and an ITO substrate) or a film (for example, a resin film such as a triacetyl cellulose film, a polyester film, and an acrylic film) by spin coating, flood coating, roll coating, slit coating, slit coating followed by spin coating, inkjet coating, printing, and the like, and then predried (pre-baked) on a hot plate or in an oven to form a coating film. Then, the coating film is heated (post-baked) to form a cured film.

The pre-baking is carried out under conditions of heating temperature and heating time each appropriately selected from, for example, a temperature ranging from 70° C. to 160° C. and a time ranging from 0.3 to 60 minutes. The heating temperature is preferably 80° C. to 140° C. and the heating time is preferably 0.5 to 10 minutes.

The post-baking is carried out, for example, at a heating temperature selected from a temperature ranging from 140° C. to 250° C. for 5 to 30 minutes on a hot plate or for 30 to 90 minutes in an oven.

The cured film formed using the thermosetting composition having photo alignment properties of the present invention has, for example, a film thickness of 0.1 to 30 μm, and the film thickness can be appropriately selected considering a level difference and optical and electrical characteristics of a substrate to be used.

The coating film formed by using the composition for forming a thermoset film having photo alignment properties of the present invention is cured under the conditions described above so as to form a cured film that can thoroughly cover the level difference of a substrate and that has high transparency.

The thermoset film having photo alignment properties formed in this manner is subjected to polarized UV exposure so as to function as a liquid crystal material alignment layer, namely, a layer aligning a compound having liquid crystallinity.

As the method of polarized UV exposure, ultraviolet light having a wavelength of 150 to 450 nm is typically used, and linear polarization is applied from a perpendicular or oblique direction at room temperature or while heating.

The liquid crystal alignment layer formed from the thermoset film composition having photo alignment properties of the present invention has solvent resistance and heat resistance. Hence, the liquid crystal alignment layer is coated with a retardation material followed by heating to the phase transition temperature of a liquid crystal to make the retardation material into a liquid crystal state, and the material is photo-cured to form a layer having optical anisotropy.

Examples of the usable retardation material include a liquid crystal monomer having a polymerizable group and a composition containing the monomer. The liquid crystal alignment layer formed on a film serving as the substrate is useful as an optically anisotropic film. Such a retardation material has various alignment properties such as horizontal alignment properties, cholesteric alignment properties, perpendicular alignment properties, and hybrid alignment properties, and each material can be selectively used depending on required retardance.

Two substrates having the liquid crystal alignment layer prepared as above are laminated via a spacer such that the liquid crystal alignment layers face each other, and then a liquid crystal is poured between the substrates to prepare a liquid crystal display device having the aligned liquid crystal.

Therefore, the composition for forming a thermoset film having photo alignment properties of the present invention can be suitably used for various optically anisotropic films and liquid crystal display devices.

The composition for forming a thermoset film having photo alignment properties of the present invention is also useful as a material for forming a cured film such as a protective film and an insulating film in various displays such as a thin film transistor (TFT) liquid crystal display device and an organic EL device. In particular, the composition for forming a thermoset film having photo alignment properties of the present invention is preferred as a material for forming an overcoat material for a color filter, an interlayer insulating film for a TFT liquid crystal device, an insulating film for an organic EL device, and the like.

EXAMPLES

Hereinafter, the present invention will be described in further detail with reference to examples, but the present invention is not limited to these examples.

[Abbreviations Used in Examples]

Abbreviations used in Examples below are as follows.

<Acrylic Polymer Raw Material>

HEMA: 2-hydroxyethyl methacrylate

MMA: methyl methacrylate

MAA: methacrylic acid

CHMI: N-cyclohexylmaleimide

CIN: 4-(6-methacryloxyhexyl-1-oxy)cinnamic acid methyl ester

AIBN: α,α'-azobisisobutyronitrile

<Cross-Linking Agent>

HMM: hexamethoxymethylmelamine

TMGU: 1,3,4,6-tetrakis(methoxymethyl)glycoluril

<Acid or Thermal Acid Generator>

PTSA: p-toluenesulfonic acid monohydrate

<Sensitizer>

DEAB: N,N'-diethylaminobenzophenone

NF: 4-nitrofluorene

<Solvent>

CHN: cyclohexanone

PM: propylene glycol monomethyl ether

PMA: propylene glycol monomethyl ether acetate

The number average molecular weight and the weight average molecular weight of each acrylic copolymer obtained in accordance with Synthesis Examples below were determined using a GPC apparatus manufactured by JASCO Corporation (SHODEX® columns KF 803 L and KF 804 L) while flowing tetrahydrofuran as an elution solvent at a flow rate of 1 mL/minute through a column (a column temperature of 40° C.). The number average molecular weight (hereinafter, called Mn) and the weight average molecular weight (hereinafter, called Mw) are shown in terms of polystyrene.

Synthesis Example 1

In 133.5 g of CHN, 40.0 g of CIN, 10.0 g of HEMA, and 1.2 g of AIBN as a polymerization catalyst were dissolved, and the whole was reacted at 85° C. for 20 hours to produce a particular copolymer solution (a solid content concentration of 27% by mass) (P1). The obtained particular copolymer had an Mn of 7,080 and an Mw of 14,030.

Synthesis Example 2

In 166.8 g of CHN, 48.0 g of CIN, 12.0 g of MMA, and 1.3 g of AIBN as a polymerization catalyst were dissolved, and the whole was reacted at 80° C. for 20 hours to produce a particular copolymer solution (a solid content concentration of 27% by mass) (P2). The obtained particular copolymer had an Mn of 8,700 and an Mw of 18,000.

Synthesis Example 3

In 50.7 g of PM, 2.5 g of MAA, 9.2 g of MMA, 5.0 g of HEMA, and 0.2 g of AIBN as a polymerization catalyst were dissolved, and the whole was reacted at 70° C. for 20 hours to produce an acrylic copolymer solution (a solid content concentration of 25% by mass) (P3). The obtained acrylic copolymer had an Mn of 19,600 and an Mw of 45,200.

Synthesis Example 4

In 53.9 g of PM, 3.5 g of MAA, 7.0 g of MMA, 7.0 g of HEMA, and 0.5 g of AIBN as a polymerization catalyst were dissolved, and the whole was reacted at 75° C. for 20 hours to produce an acrylic copolymer solution (a solid content concentration of 25% by mass) (P4). The obtained acrylic copolymer had an Mn of 10,300 and an Mw of 24,600.

Synthesis Example 5

In 45.5 g of PM, 9.0 g of MMA, 6.0 g of HEMA, and 0.2 g of AIBN as a polymerization catalyst were dissolved, and the whole was reacted at 70° C. for 20 hours to produce an acrylic copolymer solution (a solid content concentration of 25% by mass) (P5). The obtained acrylic copolymer had an Mn of 18,100 and an Mw of 47,100.

Synthesis Example 6

In 116 g of PMA, 17.8 g of CHMI, 9.8 g of MAA, 12.8 g of MMA, 9.8 g of HEMA, and 2.8 g of AIBN as a polymerization catalyst were dissolved, and the whole was reacted at 85° C. for 20 hours to produce an acrylic copolymer solution (a solid content concentration of 30% by mass) (P6). The obtained acrylic copolymer had an Mn of 7,200 and an Mw of 15,200.

Synthesis Example 7

In 133.5 g of CHN, 40.0 g of CIN, 10.0 g of MAA, and 1.2 g of AIBN as a polymerization catalyst were dissolved, and the whole was reacted at 80° C. for 20 hours to produce a particular copolymer solution (a solid content concentration of 27% by mass) (P7). The obtained particular copolymer had an Mn of 7,240 and an Mw of 15,350.

Examples 1 to 7 and Comparative Examples 1 to 4

Each composition of Examples 1 to 7 and Comparative Examples 1 to 4 was prepared in accordance with the formulation as shown in Table 1, and the solvent resistance, the alignment properties, the heat resistance, and the transmittance were evaluated on each composition.

TABLE 1

| | Solution of component (A) (g) | Solution of component (B) (g) | Component (C) (g) | Component (D) (g) | Component (E) (g) | Solvent (g) |
|---|---|---|---|---|---|---|
| Example 1 | P1<br>3.5 | P3<br>11.3 | HMM<br>0.38 | PTSA<br>0.038 | DEAB<br>0.019 | CHN/PM<br>12.8/1.9 |
| Example 2 | P1<br>3.5 | P3<br>11.3 | TMGU<br>0.38 | PTSA<br>0.038 | DEAB<br>0.019 | CHN/PM<br>12.8/1.9 |
| Example 3 | P1<br>3.5 | P4<br>11.3 | TMGU<br>0.38 | PTSA<br>0.038 | DEAB<br>0.019 | CHN/PM<br>12.8/1.9 |
| Example 4 | P1<br>7.0 | P3<br>7.5 | TMGU<br>0.38 | PTSA<br>0.038 | DEAB<br>0.019 | CHN/PM<br>10.2/4.7 |
| Example 5 | P1<br>2.4 | P4<br>10.4 | TMGU<br>0.32 | PTSA<br>0.036 | — | CHN/PM<br>15.3/1.4 |
| Example 6 | P7<br>3.5 | P3<br>11.3 | TMGU<br>0.38 | PTSA<br>0.038 | — | CHN/PM<br>12.8/1.9 |
| Example 7 | P1<br>3.5 | P3<br>11.3 | TMGU<br>0.38 | PTSA<br>0.038 | NF<br>0.019 | CHN/PM<br>12.8/1.9 |
| Comparative Example 1 | P2<br>3.5 | P3<br>11.3 | TMGU<br>0.38 | PTSA<br>0.038 | DEAB<br>0.019 | CHN/PM<br>12.8/1.9 |
| Comparative Example 2 | P1<br>3.5 | P5<br>11.3 | TMGU<br>0.38 | PTSA<br>0.038 | DEAB<br>0.019 | CHN/PM<br>12.8/1.9 |
| Comparative Example 3 | P1<br>4.2 | P6<br>8.8 | TMGU<br>0.38 | PTSA<br>0.014 | DEAB<br>0.028 | CHN/PMA<br>12.3/4.2 |
| Comparative Example 4 | P1<br>3.3 | P3<br>12.5 | — | — | DEAB<br>0.021 | CHN/PM<br>12.5/0.9 |

[Evaluation of Solvent Resistance]

Each composition of Example 1 to Example 7 and Comparative Example 1 to Comparative Example 4 was applied onto a silicon wafer using a spin coater, and pre-baked on a hot plate at a temperature of 110° C. for 120 seconds to form a coating film having a film thickness of 1.1 vim. The film thickness was determined using F20 manufactured by FILMETRICS, Inc. The coating film was post-baked in a circulating hot air oven at a temperature of 230° C. for 30 minutes to form a cured film having a film thickness of 1.0 μm.

The cured film was immersed in CHN or NMP for 60 seconds, then dried at a temperature of 100° C. for 60 seconds, and the film thickness was determined. A film having the same film thickness as that before the immersion in CHN or NMP was evaluated as "O", and a film having a smaller film thickness than that before the immersion was evaluated as "X".

[Evaluation of Alignment Sensitivity]

Each composition of Example 1 to Example 7 and Comparative Example 1 to Comparative Example 4 was applied onto an ITO substrate using a spin coater, and pre-baked on a hot plate at a temperature of 110° C. for 120 seconds to form a coating film having a film thickness of 1.1 μm. The film thickness was determined using F20 manufactured by FILMETRICS, Inc. The coating film was post-baked in a circulating hot air oven at a temperature of 230° C. for 30 minutes to form a cured film.

The cured film was perpendicularly irradiated with linear polarization at 313 nm. Onto the substrate, a retardation material solution composed of a liquid crystal monomer was applied using a spin coater, and pre-baked on a hot plate at a temperature of 80° C. for 60 seconds to form a coating film having a film thickness of 1.4 μm. The substrate was exposed at 1000 mJ/cm$^2$ under a nitrogen atmosphere. The produced substrate was sandwiched between polarizing plates and an exposure amount of polarized UV necessary for exerting alignment properties was evaluated as alignment sensitivity. The substrate that was not aligned at 200 mJ/cm$^2$ or more was evaluated as "not aligned."

[Evaluation of Heat Resistance]

Each composition of Example 1 to Example 7 and Comparative Example 1 to Comparative Example 4 was applied onto a silicon wafer using a spin coater, and pre-baked on a hot plate at a temperature of 110° C. for 120 seconds to form a coating film having a film thickness of 1.1 μm. The film thickness was determined using F20 manufactured by FILMETRICS, Inc. The coating film was post-baked in a circulating hot air oven at a temperature of 230° C. for 30 minutes to form a cured film having a film thickness of 1.0 μm. The cured film was perpendicularly irradiated with 313-nm linear polarization at 50 mJ/cm$^2$. The cured film was further baked in a circulating hot air oven at a temperature of 230° C. for 3 hours, and the residual film ratio was measured relative to the film pressure after the post-bake.

[Evaluation of Light Transmittance (Transparency)]

Each composition of Example 1 to Example 7 and Comparative Example 1 to Comparative Example 4 was applied onto a quartz substrate using a spin coater, and pre-baked on a hot plate at a temperature of 110° C. for 120 seconds to form a coating film having a film thickness of 1.0 μm. The film thickness was determined using F20 manufactured by FILMETRICS, Inc. The coating film was post-baked in a circulating hot air oven at a temperature of 230° C. for 30 minutes to form a cured film.

The transmittance of the cured film for light of a wavelength of 400 nm was determined using an ultraviolet-visible spectrophotometer (SHIMADZU UV-2550 manufacture by Shimadzu Corporation).

[Evaluation Result]

The results of the evaluations above are shown in Table 2.

TABLE 2

| | Solvent resistance | | Alignment sensitivity | Heat resistance | Transmittance |
|---|---|---|---|---|---|
| | CHN | NMP | (mJ/cm$^2$) | (%) | (%) |
| Example 1 | ○ | ○ | 10 | 95 | 95 |
| Example 2 | ○ | ○ | 10 | 95 | 95 |
| Example 3 | ○ | ○ | 10 | 95 | 92 |
| Example 4 | ○ | ○ | 10 | 95 | 95 |

TABLE 2-continued

| | Solvent resistance | | Alignment sensitivity | Heat resistance | Trans-mittance |
|---|---|---|---|---|---|
| | CHN | NMP | (mJ/cm$^2$) | (%) | (%) |
| Example 5 | ○ | ○ | 15 | 96 | 97 |
| Example 6 | ○ | ○ | 20 | 97 | 97 |
| Example 7 | ○ | ○ | 10 | 98 | 98 |
| Comparative Example 1 | X | X | 200 | 95 | 92 |
| Comparative Example 2 | ○ | ○ | Not aligned | 95 | 93 |
| Comparative Example 3 | ○ | ○ | Not aligned | 95 | 92 |
| Comparative Example 4 | X | X | 200 | 60 | — |

Examples 1 to 7 had high heat resistance and high transparency and showed the resistance with respect to both CHN and NMP. Each film also exhibited the alignment properties by a small exposure amount.

Comparative Example 1 obtained insufficient solvent resistance and had a largely decreased alignment sensitivity. Comparative Examples 2 and 3 obtained sufficient solvent resistance, transparency, and heat resistance but did not exhibit alignment properties at all even by an exposure amount of 200 mJ/cm$^2$. Comparative Example 4 obtained insufficient solvent resistance, heat resistance, and transmittance and had a largely decreased alignment sensitivity.

INDUSTRIAL APPLICABILITY

The composition for forming a thermoset film having photo alignment properties according to the invention is very useful as a material of an optically anisotropic film and a liquid crystal alignment layer for a liquid crystal display device. The composition for forming a thermoset film having photo alignment properties according to the invention is also preferred as a material for forming a cured film such as a protective film and an insulating film in various displays such as a thin film transistor (TFT) liquid crystal display device and an organic EL device, especially as a material for forming an interlayer insulating film for a TFT liquid crystal device, an overcoat for a color filter, an insulating film for an organic EL element, for example.

The invention claimed is:

1. A composition for forming a thermoset film having photo alignment properties, the composition comprising:

a component (A) that is an acrylic copolymer having a photodimerizing moiety and a thermal cross-linking moiety, wherein the photodimerizing moiety includes a structure selected from the group consisting of a cinnamoyl group, a chalcone group, a coumarin group, and an anthracene group, and the thermal cross-linking moiety includes a structure selected from the group consisting of a hydroxy group, a carboxy group, and a glycidyl group;

a component (B) that is an acrylic polymer synthesized by copolymerization of monomers consisting of 2 to 95 mol % of at least one monomer selected from monomer b1 and 5 to 98 mol % of at least one monomer selected from monomer b2:

monomer b1: methyl methacrylate, methyl acrylate, ethyl methacrylate, ethyl acrylate, propyl methacrylate, propyl acrylate, isopropyl methacrylate, isopropyl acrylate, butyl methacrylate, butyl acrylate, isobutyl methacrylate, isobutyl acrylate, t-butyl methacrylate, t-butyl acrylate, 2-hydroxyethyl methacrylate, 2-hydroxyethyl acrylate, 2-hydroxypropyl methacrylate, and 2-hydroxypropyl acrylate;

monomer b2: acrylic acid, methacrylic acid, vinylbenzoic acid, p-hydroxystyrene, m-hydroxystyrene, and o-hydroxystyrene; and a component (C) that is a cross-linking agent that is bonded to the thermal cross-linking moiety in the acrylic copolymer as the component (A) and a carboxy group moiety and/or a phenolic hydroxyl group moiety included in the component (B), wherein the cross-linking agent is selected from the group consisting of an epoxy compound, a methylol compound, and an isocyanate compound, wherein the composition is curable by heating to form said thermoset film having photo-alignment properties, and the composition exhibits photo alignment properties after exposure to perpendicular irradiation with linear polarization at 313 nm of 10 to 20 mJ/cm$^2$.

2. The composition for forming a thermoset film having photo alignment properties according to claim 1, wherein the component (A) is an acrylic copolymer obtained by a polymerization reaction of monomers including a monomer having the photodimerizing moiety and a monomer having the thermal cross-linking moiety.

3. The composition for forming a thermoset film having photo alignment properties according to claim 1, wherein the photodimerizing moiety in the component (A) is a cinnamoyl group.

4. The composition for forming a thermoset film having photo alignment properties according to claim 1, wherein the thermal cross-linking moiety in the component (A) is a hydroxy group.

5. The composition for forming a thermoset film having photo alignment properties according to claim 1, wherein the cross-linking agent in the component (C) is a cross-linking agent having a methylol group or an alkoxymethylol group.

6. The composition for forming a thermoset film having photo alignment properties according to claim 1, further comprising a component (D) that is an acid or a thermal acid generator.

7. The composition for forming a thermoset film having photo alignment properties according to claim 1, further comprising a component (E) that is a sensitizer.

8. The composition for forming a thermoset film having photo alignment properties according to claim 1, wherein the composition contains the component (C) in an amount of 1 to 40 part(s) by mass based on 100 parts by mass of a total amount of the component (A) and the component (B).

9. The composition for forming a thermoset film having photo alignment properties according to claim 6, wherein the composition contains the component (D) in an amount of 0.01 to 5 parts by mass based on 100 parts by mass of a total amount of the component (A) and the component (B).

10. The composition for forming a thermoset film having photo alignment properties according to claim 7, wherein the composition contains the component (E) in an amount of 0.1 to 20 parts by mass based on 100 parts by mass of a total amount of the component (A) and the component (B).

11. A liquid crystal alignment layer formed from the composition for forming a thermoset film having photo alignment properties as claimed in claim 1.

12. An optical device comprising:

a liquid crystal alignment layer formed from the composition for forming a thermoset film having photo alignment properties as claimed in claim 1; and a retardation layer on the liquid crystal alignment layer.

* * * * *